US011163902B1

(12) United States Patent
Clerget et al.

(10) Patent No.: US 11,163,902 B1
(45) Date of Patent: Nov. 2, 2021

(54) SYSTEMS AND METHODS FOR ENCRYPTED CONTAINER IMAGE MANAGEMENT, DEPLOYMENT, AND EXECUTION

(71) Applicant: CTRL IQ, Inc., Albany, CA (US)

(72) Inventors: Cedric Clerget, Ormenans (FR); Ian Kaneshiro, East Lansing, MI (US); Gregory Kurtzer, Albany, CA (US); John Frey, Sammamish, WA (US)

(73) Assignee: CTRL IQ, Inc., Albany, CA (US)

( * ) Notice: Subject to any disclaimer, the term of this patent is extended or adjusted under 35 U.S.C. 154(b) by 0 days.

(21) Appl. No.: 17/335,958

(22) Filed: Jun. 1, 2021

Related U.S. Application Data

(63) Continuation of application No. 17/186,287, filed on Feb. 26, 2021, now Pat. No. 11,055,428.

(51) Int. Cl.
*G06F 21/62* (2013.01)
*H04L 9/08* (2006.01)
*H04L 9/32* (2006.01)
*H04L 29/06* (2006.01)

(52) U.S. Cl.
CPC .......... *G06F 21/6218* (2013.01); *H04L 9/083* (2013.01); *H04L 9/3263* (2013.01); *H04L 63/0442* (2013.01)

(58) Field of Classification Search
None
See application file for complete search history.

(56) References Cited

U.S. PATENT DOCUMENTS

| | | | |
|---|---|---|---|
| 10,614,579 B1 | 4/2020 | Kwon et al. | |
| 2008/0246759 A1 | 10/2008 | Summers | |
| 2010/0310154 A1 | 12/2010 | Barrois et al. | |
| 2015/0098645 A1 | 4/2015 | Leung et al. | |
| 2017/0154436 A1 | 6/2017 | Zhang et al. | |
| 2017/0299404 A1 | 10/2017 | Wang et al. | |
| 2018/0285199 A1* | 10/2018 | Mitkar | G06F 11/1451 |
| 2019/0026920 A1 | 1/2019 | Yi et al. | |
| 2019/0286915 A1 | 9/2019 | Patil | |
| 2021/0103392 A1* | 4/2021 | Murray | H04L 9/083 |

* cited by examiner

*Primary Examiner* — Brandon S Hoffman
(74) *Attorney, Agent, or Firm* — Ansari Katiraei LLP; Arman Katiraei; Sadiq Ansari (57) ABSTRACT

A controller is provided to construct and run a container from one or more encrypted container images without persisting any decrypted data from the one or more encrypted container images to non-volatile storage at any time. The controller may retrieve a container image with encrypted first data and encrypted second data, and may store the container image to non-volatile storage of a particular node. The controller may construct a container by mounting the container image as part of an encrypted file system of the container. During runtime execution of the container, the encrypted first data may be extracted and decrypted from the file system in response to a file system request for the encrypted first data, and the decrypted first data may be entered into volatile storage of the particular node while the encrypted first data and the encrypted second data are retained on the non-volatile storage.

19 Claims, 6 Drawing Sheets

SYSTEMS AND METHODS FOR ENCRYPTED CONTAINER IMAGE MANAGEMENT, DEPLOYMENT, AND EXECUTION

CLAIM OF BENEFIT TO RELATED APPLICATIONS

This application is a continuation of U.S. nonprovisional application Ser. No. 17/186,287 entitled "Systems and Methods for Encrypted Container Image Management, Deployment, and Execution", filed Feb. 26, 2021 and now U.S. Pat. No. 11,055,428. The contents of application Ser. No. 17/186,287 are hereby incorporated by reference.

BACKGROUND

Containers, and the images from which the containers are constructed, provide a fundamental building block for cloud and/or distributed computing. Containers may encapsulate the components for running different services, applications, and/or other software on different computing environments.

However, the content and/or data of the underlying container images may be compromised at different stages due to insufficient security. For instance, the content and/or data of unencrypted container images may be accessed and/or altered at different repositories where the container images are stored, while in transit over a data network to one or more nodes where the container images are intended to run, and/or when the contents and/or data of the container images are persisted to disk or non-volatile storage of the one or more nodes running the container images.

DETAILED DESCRIPTION OF PREFERRED EMBODIMENTS

The following detailed description refers to the accompanying drawings. The same reference numbers in different drawings may identify the same or similar elements.

Disclosed are systems and methods for encrypted container image management, deployment, and execution. The systems and methods may secure services, contents, and/or data of a container image via encryption, and may retain the encryption throughout a runtime execution of a container that accesses the services, contents, and/or data of that container image.

In some embodiments, the systems and methods may support a secure and encrypted container image format and a secure runtime implementation for a container defined with one or more encrypted container images that adhere to the secure and encrypted image format. The encrypted container images and the secure runtime implementation of those encrypted container images may prevent unauthorized devices from accessing the services, contents, and/or data of the encrypted container image when stored at a repository, when transferred across a data network to a node for execution, and/or when persisted to disk or non-volatile storage of the node during runtime execution of the container on that node.

In some embodiments, the systems and methods may provide a controller for creating a secure runtime implementation for a container based on one or more encrypted container images, and for accessing the decrypted services, contents, and/or data of the encrypted container images without persisting the decrypted services, contents, and/or data to disk or non-volatile storage. The controller may ensure the integrity and provenance of each encrypted container image that is received by a node before instantiating, executing, or accessing the services, contents, and/or data of the encrypted container image on the node. For instance, the controller may verify that the image was created by a trusted entity, and/or may validate that the image has not been tampered with from when it was created to when it was received. Upon successful validation, the controller may store the encrypted container image to disk or non-volatile storage. The services, contents, and/or data of the encrypted container image remain secure because of the encryption that is used to obfuscate the services, contents, and/or data of the encrypted container image. The controller may then generate the secure runtime implementation for the container by mounting the encrypted container image as an encrypted file system. Services stored within the encrypted container image and the content or data accessed by those services, that may also be stored in the encrypted container image, may be decrypted from the encrypted file system into volatile memory in response to initializing the container or one or more services of the container requesting and/or accessing the encrypted services, content, and/or data. The container, as part of its runtime operation, may then execute, manipulate, and/or otherwise access the decrypted services, content, and/or data in a secure sandboxed environment created for that container in the volatile memory without the decrypted services, content, and/or data being persisted to the non-volatile storage.

Figure 1:
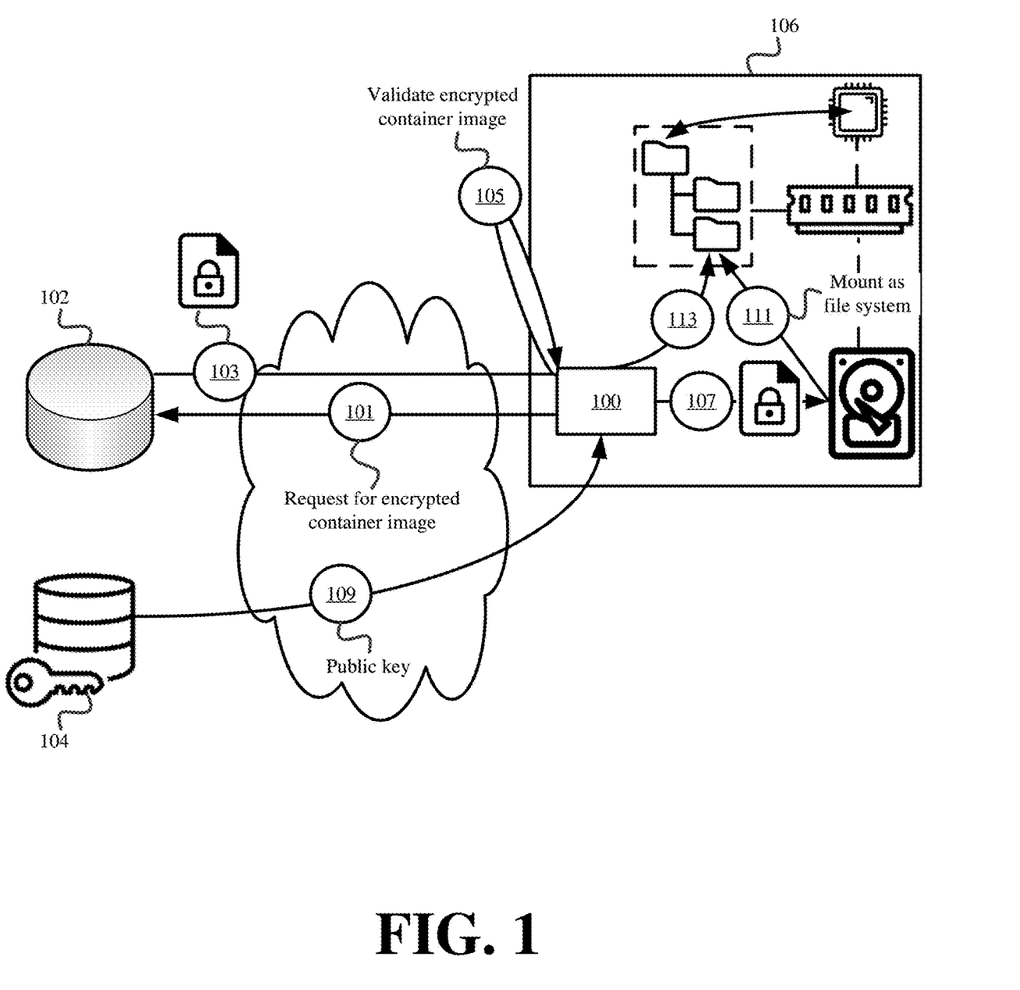
FIG. 1 illustrates an example of securely deploying and accessing contents and/or data from an encrypted container image without persisting the contents and/or data to disk or non-volatile storage in accordance with some embodiments presented herein.

FIG. 1 illustrates an example of securely deploying and accessing contents and/or data from an encrypted container image without persisting the contents and/or data to disk or non-volatile storage in accordance with some embodiments presented herein. FIG. 1 may include controller 100, repository 102, key store 104, and node 106.

Repository 102 may include one or more devices that store container images, and that deploy the container images to requesting nodes (e.g., node 106) for runtime execution. Repository 102 may store encrypted and/or unencrypted container images that are created by one or several different users. Each container image may be requested via a Uniform Resource Locator ("URL"), Application Programming Interface ("API") call, and/or other remote call procedure. Repository 102 may be part of a Docker®, Kubernetes®, Linux® Containers ("LXC"), virtual machine, and/or another container environment or framework.

Key store 104 may include one or more devices that store the keys used for encrypting and/or decrypting the encrypted container images that are stored in repository 102. In some embodiments, the keys may be generated by an asymmetric encryption system. For instance, an image creator may define one or more runtime executable services (e.g., applications, programs, scripts, instructions, commands, calls, etc.), content, and/or data for a container image, may encrypt the services, content, and/or data using a public key previously generated by key store 104, may store the encrypted container image in repository 102, and may associate the public key that may be used to retrieve the associated private key for decrypting the encrypted container image. Key store 104 may be configured with access privileges that restrict which nodes, devices, controllers, or users may obtain the private keys for each encrypted container image. In FIG. 1, it is assumed that node 106 and/or controller 100 have sufficient access privileges to request and receive the private key for one or more encrypted container images instantiated on node 106.

Node 106 may include one or more devices with a set of hardware resources for executing different services, applications, and/or other software that are stored within one or more container images. Node 106 may correspond to a reconfigurable and shareable device that may run different containers for execution of different services on behalf of users at different times. Node 106 may be part of a cluster that includes other nodes, and may be operated by a cloud computing provider or distributed platform.

Controller 100 may run on node 106 in order to generate different runtime presentations for containers comprised of one or more encrypted or unencrypted images. In some embodiments, controller 100 may include a customized container runtime for accessing and running services, content, and/or data within an encrypted container images via a dynamic runtime decryption that maintains security by entering the decrypted services, content, and/or data into volatile memory without persisting any of the decrypted services, content, and/or data from the encrypted container image to non-volatile storage.

As shown in FIG. 1, controller 100 may issue (at 101) a request to repository 102 for a particular encrypted container image. Controller 100 may issue (at 101) the request based on a manifest for a container that controller 100 is to construct and run using various hardware resources of node 106.

Repository 102 may provide (at 103) the particular encrypted container image to controller 100 in response to the request. The particular encrypted container image may include one or more partitions that store services, content, and/or data in encrypted or obfuscated form. In other words, the particular encrypted container image cannot be loaded and run within a container or other process in its encrypted form. Moreover, the encrypted or obfuscated partitions of the particular encrypted container image differ from compressed partitions of unencrypted container images. For instance, an unencrypted container image may store services, content, and/or data in a compressed "tar" archive that may be decompressed and accessed by any container runtime or process that supports tar decompression. However, the encrypted or obfuscated partitions of the particular encrypted container image may only be accessed by a customized container runtime with the correct decryption key for the particular encrypted container image.

Controller 100 may validate (at 105) the provenance and/or the contents of the particular encrypted container image. In some embodiments, the validation (at 105) may be based on a signature that is provided with the particular encrypted container image. Controller 100 may validate (at 105) the entity that created the particular encrypted container image based on the signature, and/or may validate (at 105) that the image was provided by repository 102 and that the contents of the particular encrypted container image were not altered during network transmission based on the signature. Controller 100 may perform the validation (at 105) without decrypting the particular encrypted container image.

In response to the particular encrypted container image failing any one or more of the validations (at 105), controller 100 may discard the particular encrypted container image and/or prevent the particular encrypted container image from running on node 106. In response to successfully validating (at 105) the particular encrypted container image, controller 100 may write (at 107) the particular encrypted container image to disk or non-volatile storage of node 106. Consequently, the contents of the particular encrypted container image remain in obfuscated form on the disk or non-volatile storage of node 106, wherein the disk or non-volatile storage may include a storage medium that does not lose state and/or any stored data written to the storage medium when no power is supplied to the storage medium. Accordingly, even if a user was to gain unauthorized access to node 106, the user may access the particular encrypted container image, but not the decrypted services, content, and/or data stored therein.

Controller 100 may obtain (at 109) one or more decryption keys for the particular encrypted container image from key store 104. In some embodiments, the particular encrypted container image may include an image manifest, metadata, and/or an identifier that identifies or is associated with the decryption key that is defined for the particular encrypted container image in key store 104. Controller 100 may issue a request for the decryption key and a unique signature to key store 104. Key store 104 may determine, based on the unique signature, that controller 100, and/or node 106 on which controller 100 runs, is a trusted device with access to the particular encrypted container image, and may provide (at 109) the one or more decryption keys to controller 100.

In some embodiments, controller 100 may be preconfigured with the decryption keys for the particular encrypted container image to avoid accessing key store 104. In some other embodiments, controller 100 may be preconfigured with a set of private keys that may be used to decrypt the intermediate private keys for the particular encrypted container image directly from an annotation, metadata, image manifest, filesystem layer, or partition descriptor of the particular encrypted container image.

Controller 100 may then construct a container that has runtime access to the unencrypted services, contents and/or data of the particular encrypted container image without persisting the unencrypted services, contents, and/or data to disk or non-volatile storage. To construct the container, controller 100 may mount (at 111) the particular encrypted container image as an encrypted file system of the container, and may configure (at 113) a customized runtime and/or operating system kernel of the container to use the decryption keys to dynamically decrypt any encrypted service, content, and/or data that is requested and/or accessed from the encrypted file system.

Executable services, as well as content and/or data for those services, may be requested and/or accessed by specifying paths and/or directories within the encrypted file system. Upon being requested or accessed, the services, content, and/or data may be decrypted and placed in Random Access Memory ("RAM") or volatile memory of node 106, wherein the volatile memory corresponds to a storage medium that loses state when powered down or when not actively receiving power. The decrypted services, content, and/or data placed in the volatile memory may be accessible to the kernel, other services, and/or other processes of the container also running in the volatile memory that is provisioned for the container. In some embodiments, the decrypted services, content, and/or data from the particular encrypted container image and/or the entirety of the container that incorporates the particular encrypted container image may be run within or as part of a Linux Security Module ("LSM").

In this manner, controller 100 may construct and run the container in a secure sandboxed environment that retains all decrypted software components from the particular encrypted container image in the volatile memory allocated for that container. Accordingly, controller 100 may be able to preserve security and encryption of the particular encrypted container image throughout runtime execution of the container incorporating decrypted services, content, and/or data of the particular encrypted container image. In some embodiments, the decrypted services, contents, and/or data of the particular encrypted container image may be accessed by other services, container images, and/or components of the container running in the same secure sandboxed environment created in the volatile memory for the container. Explicit calling of the container or its workloads, as well as LSM and/or other security wrappers, may prevent unauthorized users and/or other containers, services, or processes from accessing the portion of the volatile memory on node 106 reserved for the container that is constructed in whole or part from the particular encrypted container image.

In some embodiments, controller 100 may construct a container with different layers of encrypted and unencrypted container images. In some such embodiments, controller 100 may provide interoperability between the encrypted and unencrypted container images by generating a coherent file system, and attaching each container image to the coherent file system. For instance, controller 100 may mount each of the encrypted and unencrypted container images as a different file system of the coherent file system, and the contents of each container image may be accessed with a different or unique path. In particular, content from an unencrypted container image may be directly accessed via a first path, and content from an encrypted container image may be accessed via a different second path with dynamic runtime decryption of the services, content, and/or data accessed from the second path. Once again, the decrypted content from each encrypted container image may remain within volatile memory without being persisted to disk or non-volatile storage despite the encrypted container image being integrated in a container that includes one or more unencrypted layers or unencrypted container images that may be persisted to disk or non-volatile storage.

With the mixing and matching of encrypted and unencrypted layers, controller 100 may generate a secure runtime presentation for a container that supports an Open Container Initiative ("OCI") construction of layers, and that improves upon the OCI specification by supporting encrypted layers or encrypted container images. For instance, controller 100 may generate a runtime presentation for a container that includes open-sourced components of an unencrypted container image. The open-sourced components may run in conjunction with proprietary services or confidential data from an encrypted container image. The propriety services or confidential data may remain in encrypted or obfuscated form on disk or non-volatile storage of the node throughout execution of the container and/or throughout execution of the runtime presentation. Even if the runtime node is compromised or accessed without authorization, the contents or data of the encrypted container image cannot be accessed or read out from disk or non-volatile storage of the node.

Figure 2:
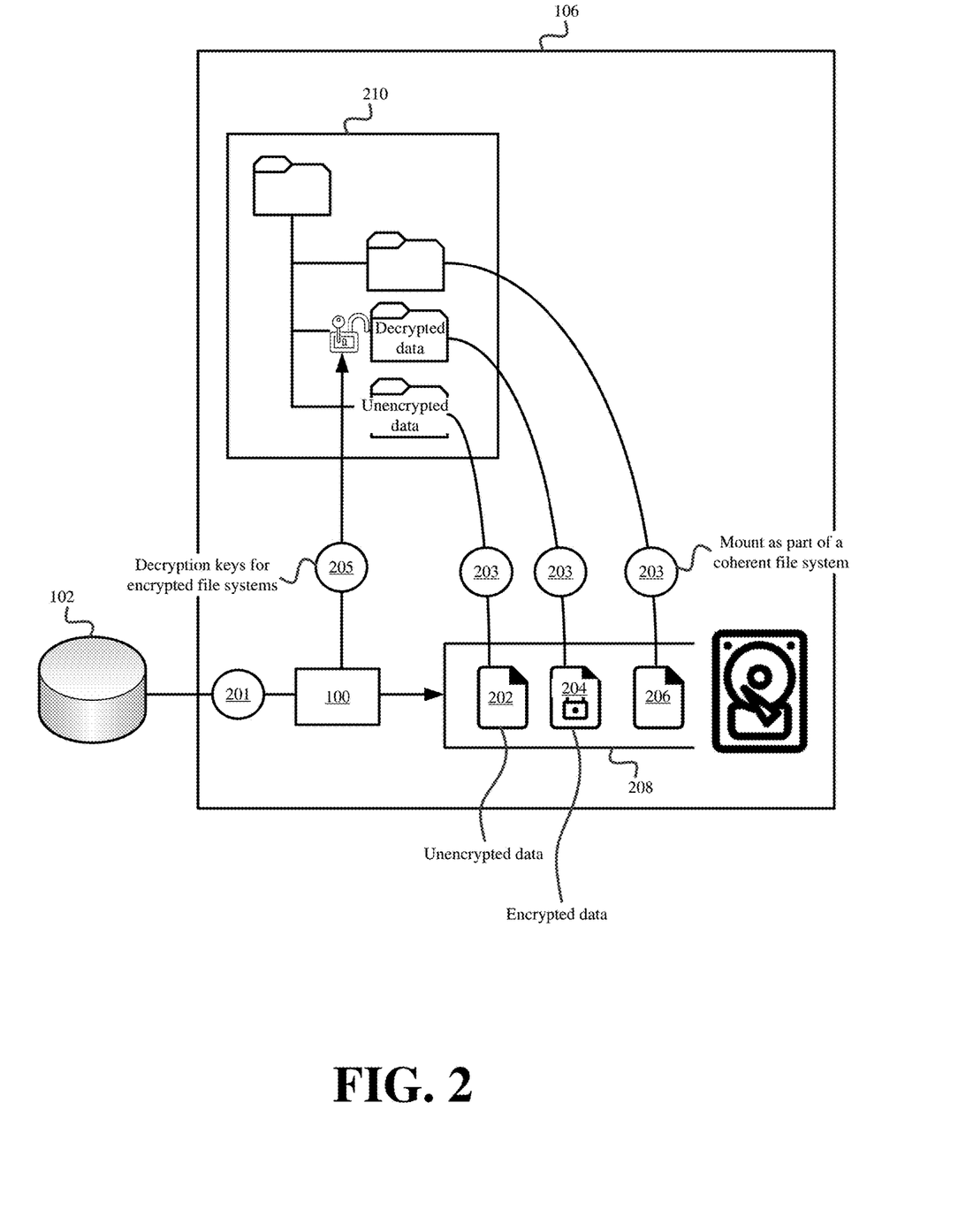
FIG. 2 illustrates an example of securely constructing and running a container using layers of encrypted and unencrypted container images in accordance with some embodiments presented herein.

FIG. 2 illustrates an example of securely constructing and running a container using layers of encrypted and unencrypted container images in accordance with some embodiments presented herein. As shown in FIG. 2, controller 100 may retrieve (at 201) first unencrypted container image 202, second encrypted container image 204, and third unencrypted container image 206 from one or more repositories 102 in order to construct and run a particular multi-layer container. The container images of the particular multi-layer container as well as the loading sequence, repository storage locations, and/or parameters for the particular multi-layer container may be stored within a container manifest, container metadata, and/or associated container files. Controller 100 or another component running on node 106 may obtain the container manifest, and may retrieve (at 201) first unencrypted container image 202, second encrypted container image 204, and third unencrypted container image 206 based on the declaration of container images in the container manifest.

Controller 100 may validate each retrieved container images 202, 204, and 206 prior to storing the container images 202, 204, and 206 on disk or non-volatile storage 208 of node 106. Additionally, controller 100 may determine that image 204 is an encrypted container image, and may retrieve one or more decryption keys for that encrypted container image. In some embodiments, controller 100 may be configured with identifiers or network addressing of trusted devices at which different decryption keys for different encrypted container images may be obtained. In some embodiments, the container manifest may identify a location from which to retrieve the decryption keys.

Controller 100 may construct the container defined by the container manifest, with each of container images 202, 204, and 206 serving as a different service, data, and/or another layer of the container. Constructing the container and/or runtime presentation for the container may include mounting (at 203) each container image 202, 204, and 206 to coherent file system 210 of the container. In particular, controller 100 may mount (at 203) each container image 202, 204, and 206 by attaching each container image 202, 204, and 206 to a mount point, directory, or path that is accessible through coherent file system 210. In some embodiments, controller 100 may create a mount point for each container image 202, 204, and 206, wherein the mount point may include an empty directory under a root directory of coherent file system 210. Coherent file system 210 may be maintained within a partitioned section of volatile memory that is reserved for exclusive use of the container, and may be linked to the container kernel.

Controller 100 may provide (at 205) the decryption keys for accessing encrypted container image 204 to coherent file system 210, the container kernel, and/or another operating system service for accessing decrypted content and/or data from the encrypted file system represented by encrypted container image 204. In some embodiments, controller 100 may use the decryption keys to configure an operating system image or service contained within unencrypted container image 202 or 206. For instance, the "dm-crypt" service may be used to access decrypted content from a file system that was encrypted using the dm-crypt service.

Through coherent file system 210, the runtime presentation of the container may access the services, content, and/or data stored within mounted container images 202, 204, and 206. Moreover, coherent file system 210 may allow for services, programs, applications, and/or other components of one container image to interoperate with or access services, programs, applications, content, data, and/or other components of another container image.

For instance, unencrypted container image 202 may represent a commonly available Linux distribution for which encryption is not required. Unencrypted container image 206 may represent an open-sourced service or application that runs within the Linux distribution of unencrypted container image 202. Moreover, the open-sourced service or application from unencrypted container image 206 may operate in conjunction with one or more proprietary services and/or data stored within encrypted container image 204. Coherent file system 210 may dynamically decrypt the proprietary services and/or data within encrypted container image 204, and may load those services and/or data into volatile memory where they can be safely and securely accessed by the open-sourced service or application of unencrypted container image 206 without the proprietary services and/or data being persisted to disk or non-volatile storage 208 of node 106. In this manner, controller 100 may support the reuse and mixing of different unencrypted and encrypted container images as part of securely constructing and running containers with one or more layers of secure and/or encrypted services, content, and/or data.

Figure 3:
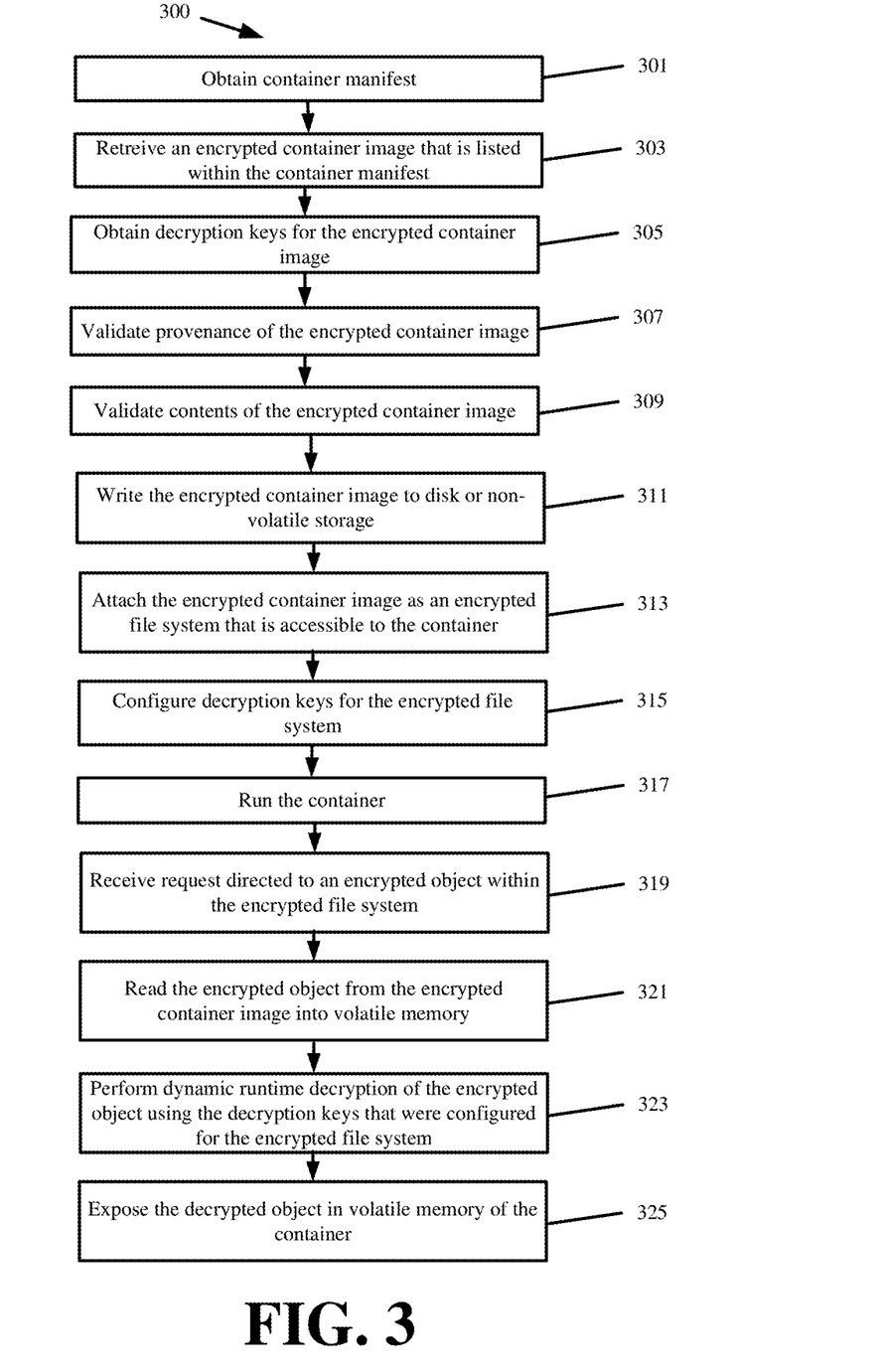
FIG. 3 presents a process for generating the runtime presentation for a container that includes at least one encrypted container image in accordance with some embodiments presented herein.

FIG. 3 presents a process 300 for generating the runtime presentation for a container that includes at least one encrypted container image in accordance with some embodiments presented herein. Process 300 may be implemented by controller 100 running using hardware resources of node 106 onto which the container is to be deployed and run.

Process 300 may include obtaining (at 301) a container manifest. Controller 100 may obtain (at 301) the container manifest from a remote site or URL after initializing on node 106, or may be configured with the container manifest prior to being deployed and/or initialized on node 106.

Process 300 may include retrieving (at 303) an encrypted container image that is listed within the container manifest from repository 102. The container manifest may provide a URL, network address, API call, command, or other identifier with which controller 100 may retrieve (at 303) the encrypted container image over a data network. The encrypted container image may be transferred from repository 102 or another remote network node to controller 100 or node 106 on which controller 100 runs. In some embodiments, the encrypted container image may be transferred as one or more data packets using a secure network protocol (e.g., Transport Layer Security ("TLS")).

Controller 100 may determine that the retrieved container image is encrypted via identifiers in the container image name (e.g., "name+enc"), identifiers in the container manifest, and/or annotations, metadata, and/or the image layout definition of the encrypted container image. Process 300 may include obtaining (at 305) decryption keys for the encrypted container image. In some embodiments, controller 100 may be configured with or initialized with the decryption keys that are required for decrypting the contents of the encrypted container image. In some other embodiments, controller 100 may be configured with the network addressing or identifier of trusted key store 104, and may dynamically request and retrieve different decryption keys based on different encrypted container images that are identified in the container manifest. For instance, controller 100 may issue a request to key store 104 that includes an identifier (e.g., a URL, image name, etc.) of the encrypted container image and a signature for node 106 or controller 100. Key store 104 may determine that node 106 or controller 100 is authorized to access the identified encrypted container image, and may provide the decryption key for that encrypted container image to controller 100.

Process 300 may include validating (at 307) the provenance of the encrypted container image. In some embodiments, controller 100 may validate (at 307) the provenance of the encrypted container image using a signature of the encrypted container image. The signature may identify the source that originated the encrypted container image, and/or the source that distributed the encrypted container image (e.g., repository 102). Controller 100 may use one or more of the authentication keys and/or hashes to verify that the signature is authentic and valid. Controller 100 may then determine whether the encrypted container image is provided by a trusted source or repository. For instance, controller 100 may be configured with a trusted public key or certificate, and may verify the trusted source or repository based on the trusted public key or certificate.

In the event that the encrypted container image fails the validation (at 307), controller 100 may discard the encrypted container image. Alternatively, controller 100 may attempt to retrieve the encrypted container image from a different source or repository.

Process 300 may include validating (at 309) the contents of the encrypted container image to ensure that the image was not altered or tampered during storage or transmission. Validating (at 309) the contents may include determining that a checksum of the encrypted container image matches a checksum that is encrypted or provided as a cryptographic signature as part of the encrypted container image.

In some embodiments, controller 100 may perform the validations (at 307 and/or at 309) prior to retrieving (at 303) the encrypted container image. For instance, controller 100 may be configured with a set of rules that prevent controller 100 from retrieving certain container images, image types, and/or container images from certain sources, and may validate the one or more signatures associated with the encrypted container image and/or source prior to retrieving (at 303) the encrypted container image.

Once the encrypted container image is successfully validated, controller 100 may begin to construct a runtime presentation that is based on or includes the decrypted contents of the encrypted container image. Accordingly, process 300 may include writing (at 311) the encrypted container image to disk or non-volatile storage of node 106 on which the container is to run. The non-volatile storage may include magnetic and/or mechanical disk, solid state drives ("SSDs"), flash memory, and/or other storage devices or mediums that retain their state with or without a continuous or active supply of power.

Process 300 may include attaching (at 313) the encrypted container image to a file system that the runtime presentation of the container may access. Attaching (at 313) the encrypted container image may include creating a mount point, and mounting the encrypted container image as an encrypted file system to the mount point. Mounting the encrypted container image may include creating a directory or path by which the contents of the encrypted container image may be accessed by the kernel, operating system, and/or other executable services of the container.

It should be noted that the runtime presentation and the file system for the container may be maintained entirely within volatile memory of node 106. More specifically, the volatile memory of node 106 may be partitioned to exclusively allocate a portion of the volatile memory for the container. The allocated portion of the volatile memory may be accessible to the container and/or running services within the container. In this manner, controller 100 may create a sandboxed environment within the volatile memory of node 106 that is restricted to other containers, services, users, and/or any access from outside the container.

At this stage, the contents of the encrypted container image remain encrypted, and the encrypted contents reside entirely on the non-volatile storage of node 106. Accordingly, process 300 may include configuring (at 315) the decryption keys that are used in decrypting content from the encrypted container image and/or from the directories or paths created for the encrypted file system.

In some embodiments, configuration (at 315) of the decryption keys may be performed as part of creating the container runtime bundle based on the encrypted container image layout. The encrypted container image layout may specify the directory structure for OCI addressable content, location addressable references within the encrypted container layout, and decryption operations to perform in accessing certain content from certain locations, layers, or partitions of the encrypted container image.

In some embodiments, configuration (at 315) of the decryption keys may be performed as part of creating the encrypted file system for the encrypted container image according to an image layer filesystem changeset that is defined for the encrypted container image. The image layer filesystem changeset may specify the encrypted media types within the encrypted container image, and may specify the encrypted state of the media types. For instance, the image layer filesystem changeset may include reference "application/vnd.oci.image.layer.v1.sfs+luks" that identifies a SquashFS file system that is embedded within the container image and that is encrypted using Linux Unified Key Setup ("LUKS"). The image layer filesystem changeset may specify an initial root filesystem, and the creation and/or linkage of the encrypted file system under the initial root filesystem.

Process 300 may incorporate additional container images to the container by mounting each additional container image that is specified in the container manifest as another accessible file system within the coherent file system of the container. Process 300 may include running (at 317) the container by initializing and/or executing various applications, programs, and/or services that become accessible through the one or more mount points to the different container images.

Process 300 may include receiving (at 319) a request directed to an encrypted object (e.g., service, content, or data) within the encrypted file system. For instance, a running service within the container may issue a call to invoke another service or to access data that is stored in a path or directory within the encrypted file system. The request may specify a directory or path that is accessed via the mount point created for the encrypted file system, and/or that targets specific services, files, content, and/or other data within the encrypted container image.

Process 300 may include reading (at 321) and/or extracting the encrypted object from the encrypted container image into the portion of volatile memory allocated for the container, and performing (at 323) a dynamic runtime decryption of the encrypted object using the decryption keys that were configured (at 315) for the encrypted file system. Process 300 may include exposing (at 325) the decrypted object in volatile memory of the container where the decrypted object may be accessed by the calling service, or where the decrypted object may begin execution of a set of commands, instructions, or code in response to the request.

Process 300 demonstrates how the contents of the encrypted container image remain encrypted even throughout runtime execution of the container. Once an encrypted object from the encrypted container image is requested during runtime execution of the container, the decrypted contents may reside within volatile memory of that container without being persisted to disk or non-volatile storage of node 106. Moreover, the decrypted contents may be stored in a secure sandboxed environment that is created exclusively for the particular container.

In some embodiments, the secure framework for executing a container with encrypted container images may support the writing back of encrypted data to the encrypted container images. For instance, the runtime of a stateful container may issue a request to write back a modified state for a decrypted object to an encrypted container image. The decryption keys may also serve as encryption keys with which to encrypt the modified state for the decrypted object. The modified state may then be obfuscated as part of an encrypted object that is written back into the encrypted container image and persisted in encrypted form to non-volatile storage.

Figure 4:
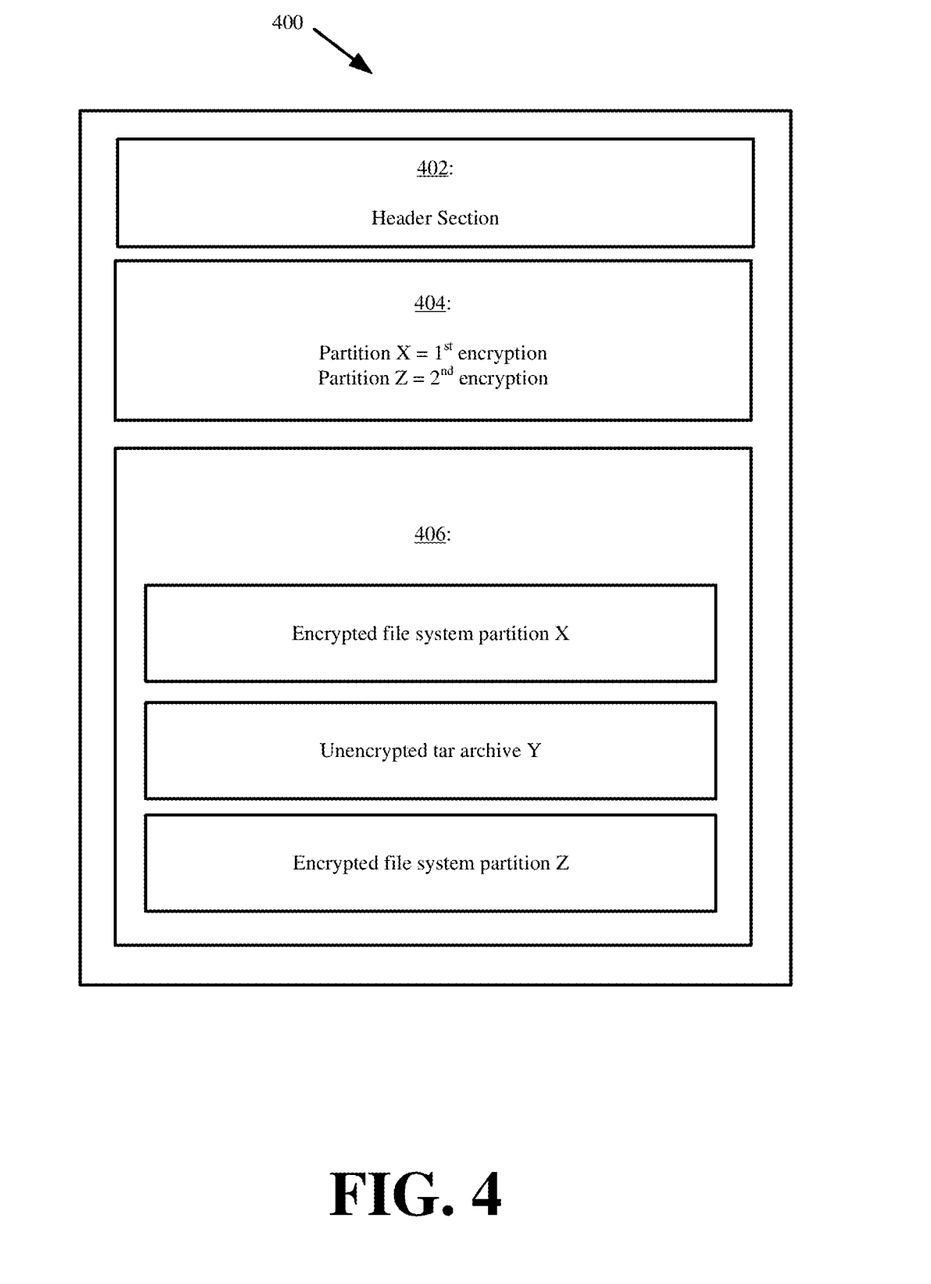
FIG. 4 illustrates an example encrypted container image format from which a container runtime presentation may be generated without persisting decrypted contents of the container image to non-volatile storage in accordance with some embodiments presented herein.

FIG. 4 illustrates an example encrypted container image format 400 from which a container runtime presentation may be generated without persisting decrypted contents of the container image to non-volatile storage in accordance with some embodiments presented herein. Encrypted container image format 400 may conform and/or be compliant with the OCI container image format specification, but may include enhancements for supporting encrypted layers or encrypted container images that are defined as part of the OCI container image format specification.

Encrypted container image format 400 may be divided into header section 402, descriptor section 404, and partition section 406. In some embodiments, encrypted container image format 400 may include additional sections and/or supplemental definitions. For instance, a container image defined according to encrypted container image format 400 may also be defined with an image manifest, image layout, image index, and/or other supplemental information.

Header section 402 may include metadata about the encapsulated container data. Description section 404 may include descriptors for the partitions within partition section 406. For instance, the descriptors may describe the disposition of the partition content, the type of content, a content identifier or digest for accessing the partition and/or content, and/or a content size for validation purposes. Moreover, in some embodiments, references to the encryption keys or type of encryption used to generate one or more encrypted partitions may be stored in header section 402 or descriptor section 404. For instance, descriptor section 404 may identify a first partition in partition section 406 that is encrypted using a first encryption, and may provide a reference or link for retrieving the decryption keys associated with the first encryption. The reference or link may include a URL or address for a key store where the keys are stored.

Partition section 406 may store the different services, content, and/or data of the container image as different layers. Signatures may be added as annotations to reference each partition. A difference between encrypted container image format 400 and the OCI container image format is that encrypted container image format 400 supports encrypted and unencrypted partitions, as well as different types of encryptions for the encrypted partitions, in partition section 406. More specifically, the OCI container image format is limited to tar archives that may be compressed or uncompressed. Encrypted container image format 400 may support file systems within partition section 406, and the file systems may be encrypted with different encryption schemes. For instance, partition section 406 may include a first partition with a SquashFS file system that is encrypted with a first encryption (e.g., Advanced Encryption Standard ("AES")), and a second partition with an Extended File System ("ext") file system that is encrypted with a second encryption (e.g., Rivest-Shamir-Adleman ("RSA")).

In some embodiments, encrypted container image format 400 may be used to define a single image for constructing a complete container with one or more encrypted layers in which the encrypted contents are persisted to non-volatile storage while the decrypted contents are never persisted to non-volatile storage. In other words, a single container image defined according to encrypted container image format 400 may include each of the components by which to build and run a container. In some other embodiments, encrypted container image format 400 may be used to define one or more encrypted container images that may be combined with or without unencrypted container images defined according to the OCI container image format in order to construct different layers of a container.

Figure 5:
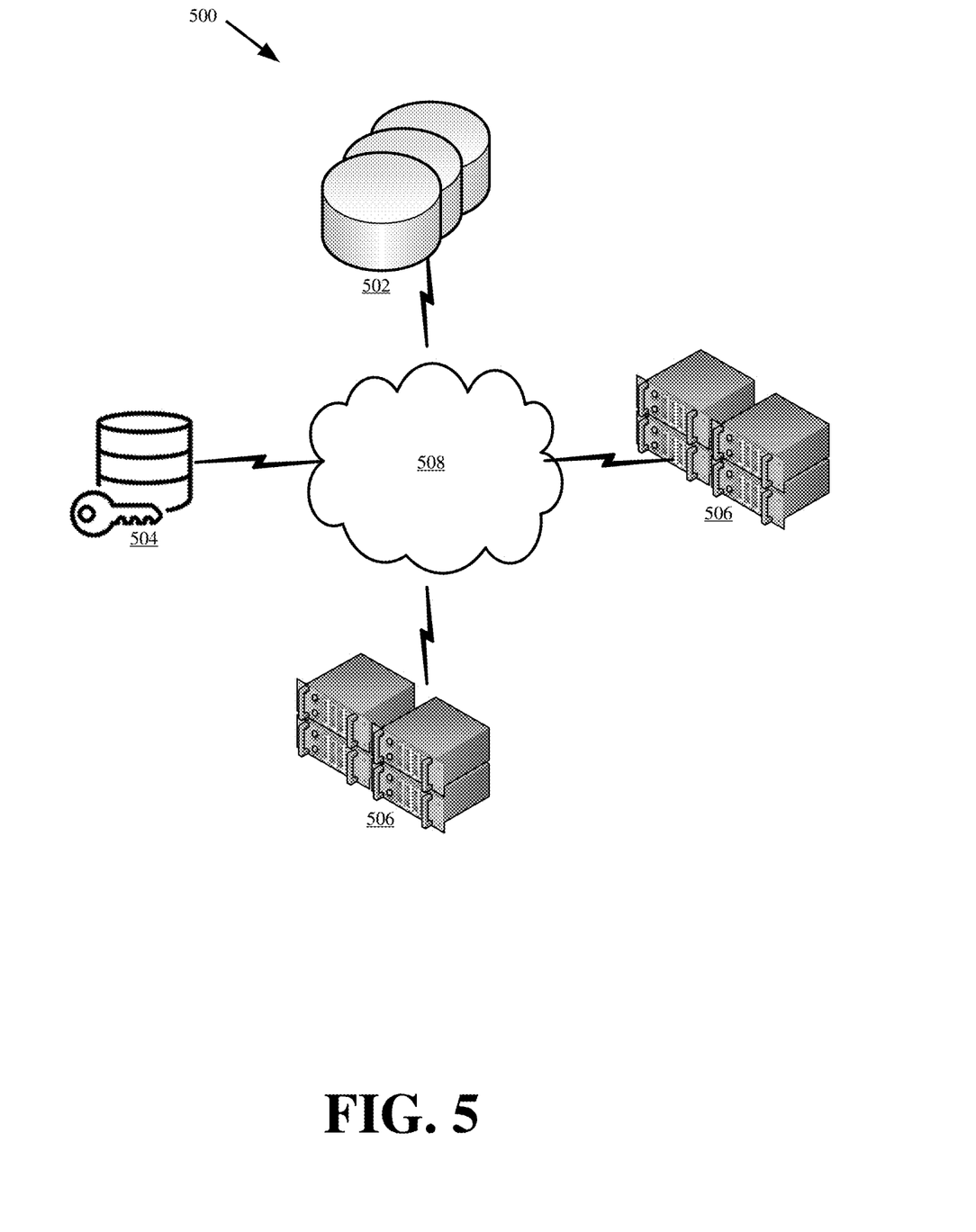
FIG. 5 illustrates an example architecture for implementing the encrypted container image management, deployment, and execution in accordance with some embodiments presented herein.

FIG. 5 illustrates an example architecture 500 for implementing the encrypted container image management, deployment, and execution in accordance with some embodiments presented herein. Architecture 500 may include one or more repositories 502, key store 504, nodes 506, and data network 508.

Repositories 502 may include one or more devices or data stores that receive and store different container images from different users. The container images may include encrypted or unencrypted images. The container images may be encapsulated as file systems that may be dynamically mounted in order to access the contents of that image and/or to build a container from different images serving as different service and/or data layers of that container.

Key store 504 may include one or more devices that serve as a trusted source, and that distribute the encryption and/or decryption keys to nodes 506 that are to run one or more of the encrypted container images. Key store 504 may include an authorization list that permits a first subset of nodes 506 access to decryption keys for a first set of encrypted container images, and a different second subset of nodes 506 access to decryption keys for a second set of encrypted container images. In this manner, key store 504 may restrict which encrypted container images are allowed to run on which nodes 506.

Nodes 506 may include devices with shareable and configurable hardware resources. For instance, the container images may utilize various processor, memory, storage, network, and/or resources of nodes 506. Each container may run using a partitioned subset of resources from a particular node 506, and the particular node 506 may simultaneously run multiple containers to perform different tasks. Nodes 506 may be operated by any cloud service provider, and may be distributed to operate from different geographic and/or network locations.

In some embodiments, a controller 100 may be installed on each node 506 in order to allocate resources from a particular node 506 to one or more containers, to construct the containers that run on that node 506, and/or to manage or control the operation of the containers. In some other embodiments, a single controller 100 may control the resource allocation, container construct, and container management for a set of nodes 506 operating in a common site or cluster.

Figure 6:
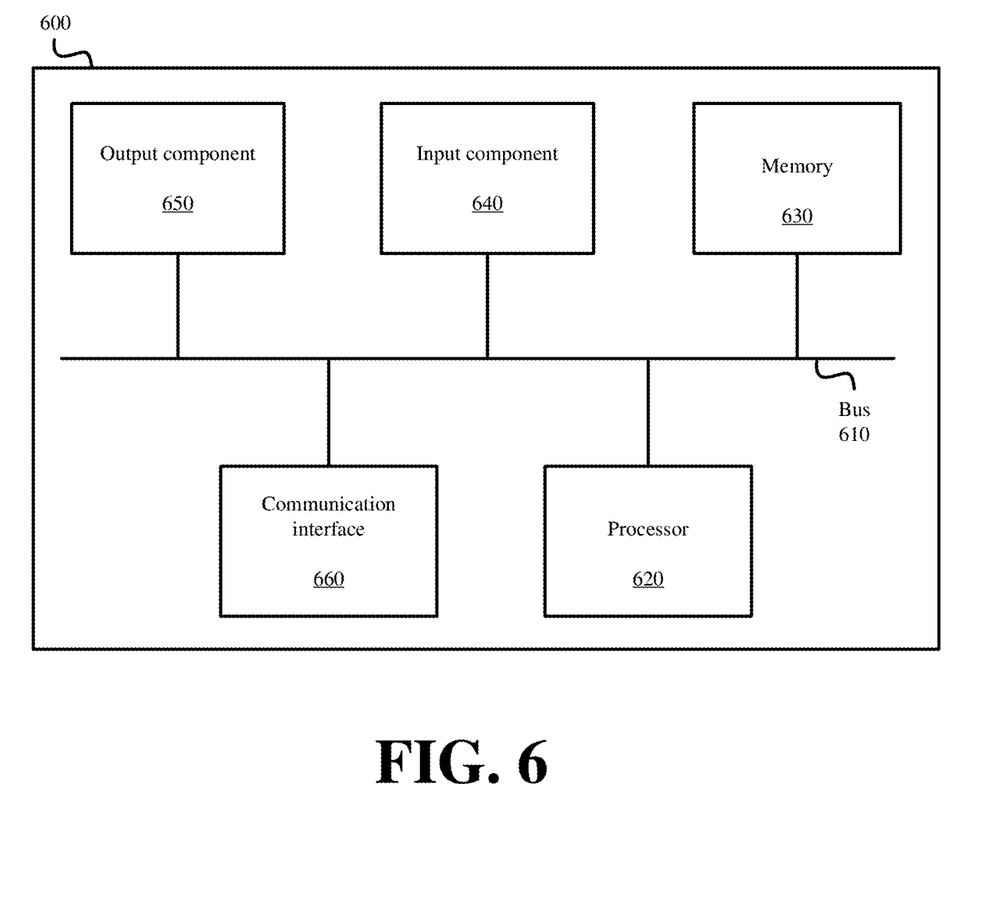
FIG. 6 illustrates example components of one or more devices, according to one or more embodiments described herein.

FIG. 6 is a diagram of example components of device 600. Device 600 may be used to implement one or more of the devices or systems described above (e.g., nodes 506, controller 100, etc.). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   retrieving an encrypted first container image and an unencrypted second container image from at least one source, wherein the encrypted first container image comprises at a least a first service or data that is in an encrypted and unreadable format;
   storing the encrypted first container image and the unencrypted second container image to non-volatile storage of a particular node;
   defining a particular container to run based on a combination of one or more encrypted services and data of the encrypted first container image and one or more unencrypted services and data of the unencrypted second container image; and
   generating a secure runtime presentation for the particular container within a sandboxed environment in volatile storage of the particular node using at least the first service or data that is dynamically decrypted into the volatile storage from the encrypted first container image stored on the non-volatile storage, and at least a second service or data that is directly retrieved into the volatile storage from the unencrypted second container image stored on the non-volatile storage without decryption, wherein the first service or data remains in the encrypted and unreadable format on the non-volatile storage, and wherein the first service or data decrypted from the encrypted first container image remains entirely within the volatile storage without being persisted to the non-volatile storage.

2. The method of claim 1 further comprising:
   constructing a coherent file system for the particular container, wherein constructing the coherent file system comprises:
      generating a first path with which to dynamically decrypt services or data from the encrypted first container image; and
      generating a second path with which to directly retrieve unencrypted services or data from the unencrypted second container image.

3. The method of claim 1, wherein services or data of the encrypted first container image are stored in an obfuscated and unreadable format on the non-volatile storage, and wherein services or data of the unencrypted second container image are stored in an unobfuscated and readable format on the non-volatile storage.

4. The method of claim 1 further comprising:
running the particular container entirely within the sandboxed environment in the volatile storage via combined execution of the first service or data and the second service or data.

5. The method of claim 1 further comprising:
decrypting an encrypted executable service from the encrypted first container image as the first service or data;
providing unencrypted data from the unencrypted second container image as the second service or data and as input to the encrypted executable service; and
generating output in response to the encrypted executable service processing the unencrypted data from the unencrypted second container image.

6. The method of claim 1 further comprising:
decrypting encrypted data from the encrypted first container image as the first service or data;
retrieving an executable service directly from the unencrypted second container image as the second service or data;
providing decrypted data resulting from said decrypting as input to the executable service; and
generating output in response to the executable service processing the decrypted data from the encrypted first container image.

7. The method of claim 6 further comprising:
encrypting the output within the sandboxed environment;
writing encrypted output resulting from said encrypting to the encrypted first container image; and
storing the encrypted output within the encrypted first container image.

8. The method of claim 1, wherein the encrypted first container image comprises proprietary or confidential services or data, and wherein the unencrypted second container image comprises open-sourced services or data that are combined with the proprietary or confidential services or data to construct and run the particular container.

9. The method of claim 1 further comprising:
generating a first layer of the particular container based on the first service or data that is decrypted from the encrypted first container image;
generating a second layer of the particular container based on the second service or data that is directly retrieved from the unencrypted second container image; and
running the particular container based on simultaneous processing of the first layer and the second layer.

10. The method of claim 1 further comprising:
obtaining a manifest for the particular container prior to retrieving the encrypted first container image and the unencrypted second container image, wherein the manifest lists the encrypted first container image and the unencrypted second container image as images of the particular container, and wherein the manifest further specifies a sequence for loading the first service or data from the encrypted first container image before the second service or data from the unencrypted second container image.

11. The method of claim 1 further comprising:
mounting the encrypted first container image to a coherent file system of the particular container;
mounting the unencrypted second container image to the coherent file system of the particular container; and
accessing the first service or data via a first path or directory of the coherent file system, and the second service or data via a second path or directory of the coherent file system.

12. The method of claim 1 further comprising:
configuring one or more decryption keys for the encrypted first container image;
receiving a call to access the first service or data;
determining that the first service or data is stored in encrypted form within the encrypted first container image; and
decrypting the first service or data from the encrypted first container image using the one or more decryption keys that are configured for the encrypted first container image.

13. The method of claim 1 further comprising:
constructing the particular container based on the first service or data that is dynamically decrypted from the encrypted first container image, and the second service or data that is directly accessible from the unencrypted second container image.

14. The method of claim 1,
wherein the non-volatile storage corresponds to one or more resources of the particular node that retain state in an absence of power, and
wherein the volatile storage corresponds to one or more resources of the particular node that lose state in the absence of power.

15. The method of claim 1, wherein the encrypted first container image comprises:
a first section listing one or more encrypted partitions of the encrypted first container image and a type of encryption used for each of the one or more encrypted partitions; and
a second section comprising at least a first partition encrypting the first service or data with a first type of encryption.

16. The method of claim 15, wherein the first partition comprises an encrypted file system, and wherein the first section comprises an identifier for one or more keys with which to encrypt or decrypt the encrypted file system.

17. The method of claim 15, wherein the second section of the encrypted first container image further comprises a second partition, and wherein the second partition is not encrypted and stores an unencrypted third service or data.

18. A system comprising:
non-volatile storage that retains state in an absence of power;
volatile storage that loses state in the absence of power; and
one or more processors configured to:
retrieve an encrypted first container image and an unencrypted second container image from at least one source, wherein the encrypted first container image comprises at a least a first service or data that is in an encrypted and unreadable format;
store the encrypted first container image and the unencrypted second container image to the non-volatile storage;
define a particular container to run based on a combination of one or more encrypted services and data of the encrypted first container image and one or more unencrypted services and data of the unencrypted second container image; and
generate a secure runtime presentation for the particular container within a sandboxed environment in the volatile storage using at least the first service or data that is dynamically decrypted into the volatile storage from the encrypted first container image stored on the non-volatile storage, and at least a second service or data that is directly retrieved into the volatile storage from the unencrypted second container image stored on the non-volatile storage without decryption, wherein the first service or data remains in the encrypted and unreadable format on the non-volatile storage, and wherein the first service or data decrypted from the encrypted first container image remains entirely within the volatile storage without being persisted to the non-volatile storage.

19. A non-transitory computer-readable medium, storing a plurality of processor-executable instructions to:
   retrieve an encrypted first container image and an unencrypted second container image from at least one source, wherein the encrypted first container image comprises at a least a first service or data that is in an encrypted and unreadable format;
   store the encrypted first container image and the unencrypted second container image to non-volatile storage of a particular node;
   define a particular container to run based on a combination of one or more encrypted services and data of the encrypted first container image and one or more unencrypted services and data of the unencrypted second container image; and
   generate a secure runtime presentation for the particular container within a sandboxed environment in volatile storage of the particular node using at least the first service or data that is dynamically decrypted into the volatile storage from the encrypted first container image stored on the non-volatile storage, and at least a second service or data that is directly retrieved into the volatile storage from the unencrypted second container image stored on the non-volatile storage without decryption, wherein the first service or data remains in the encrypted and unreadable format on the non-volatile storage, and wherein the first service or data decrypted from the encrypted first container image remains entirely within the volatile storage without being persisted to the non-volatile storage.

* * * * *